UNITED STATES PATENT OFFICE.

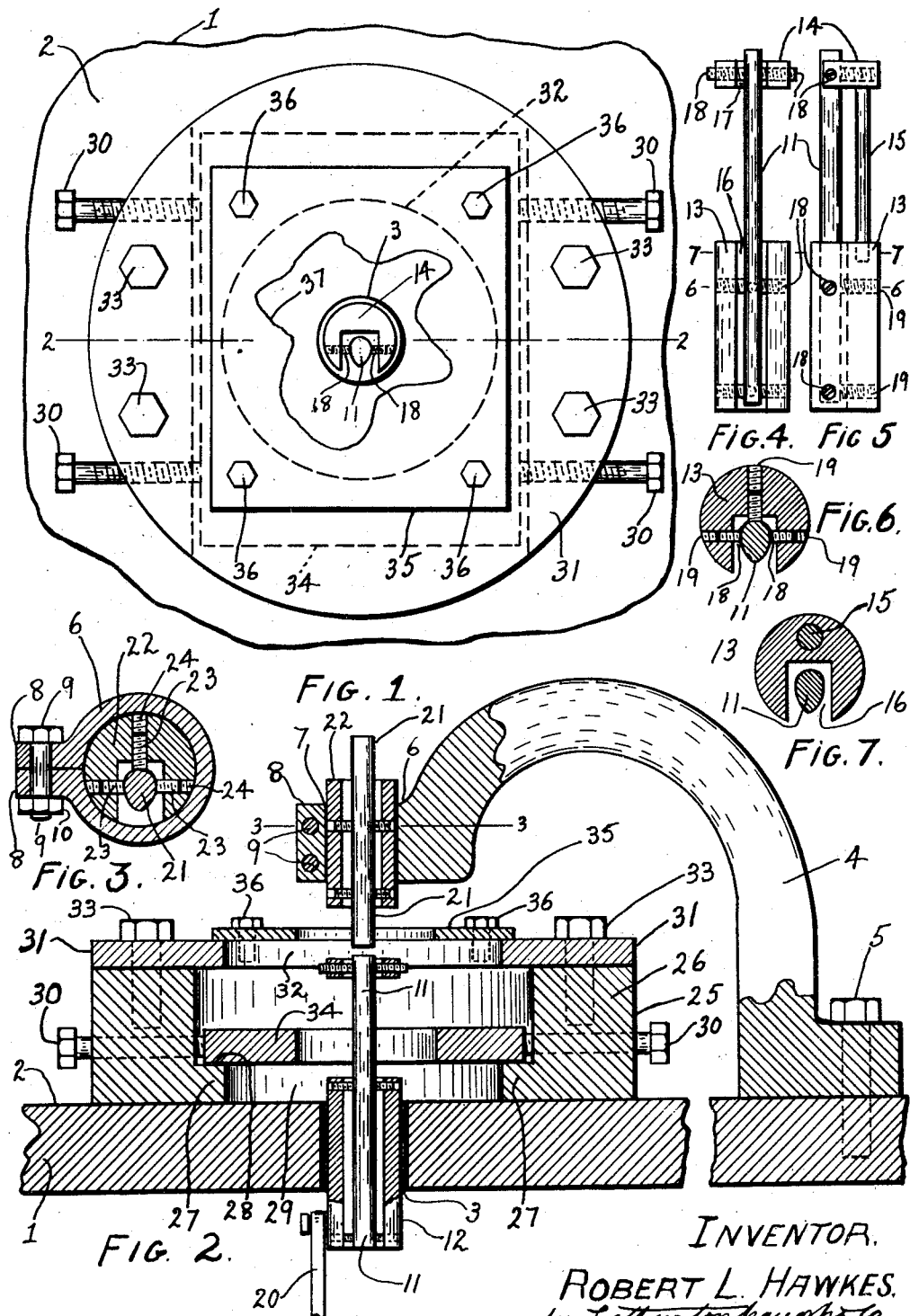

ROBERT LLOYD HAWKES, OF ST. CATHARINES, ONTARIO, CANADA.

DIE-MAKING MACHINE.

1,391,055.   Specification of Letters Patent.   Patented Sept. 20, 1921.

Application filed April 13, 1920. Serial No. 373,621.

*To all whom it may concern:*

Be it known that I, ROBERT LLOYD HAWKES, a subject of the King of Great Britain, residing at the city of St. Catharines, in the county of Lincoln, Province of Ontario, Dominion of Canada, have invented certain new and useful Improvements in Die-Making Machines, of which the following is the specification.

My invention relates to improvements in die making machines and the object of the invention is to provide a machine which will accurately reproduce the profile of a master templet upon a die or templet; a further object is to provide purely mechanical means for finishing cutting dies or templets, thus greatly lowering the cost of manufacture by reducing the time required and further by doing away with the necessity of employing highly skilled labor.

My invention consists of a table having a flat top, a cutting tool extending upwardly through the table, a guide finger supported vertically above the cutting tool, a die holder having a flat bottom being free to be moved by hand about the surface of the table, the die holder having a large central orifice therein, through which the cutting tool extends, means for securing the die blank and master templet in the die holder, the master templet being parallel to the die blank and vertically above it, the holder being moved by hand so that the guide finger follows the profile of the master templet and upon the operation of the cutting tool this profile is exactly reproduced upon the die, all as more particularly described and illustrated in the accompanying drawings in which:

Figure 1. is a plan view of my invention with the guide finger and support therefor removed for clearness.

Fig. 2. is a sectional elevation on the line 2, 2 of Fig. 1, with the guide finger included and the cutting tool being at the upper end of its travel.

Fig. 3. is a section on the line 3, 3 of Fig. 2.

Fig. 4. and Fig. 5. are front and side views respectively of one form of cutting tool and holder therefor.

Fig. 6. is a section on the line 6, 6 of Figs. 4 and 5.

Fig. 7. is a section on the line 7, 7 of Figs. 4 and 5.

Like characters of reference indicate corresponding parts in the different views.

1 is the table having the flat top surface 2 and the vertically disposed orifice 3 therethrough.

4 is an arm secured to the table by the screws 5 and having the split end 6 with the vertically disposed orifice 7 therein. The orifice 7 is vertically above the orifice 3.

8 are lugs carried by the split end 7 and 9 are bolts extending through orifices therein. 10 are nuts on the bolts 9.

11 is the cutting tool, preferably a file, which is carried in the tool holder 12 having the lower portion 13 and the upper portion 14 connected by the upright rod 15. 16 and 17 are registering longitudinally disposed recesses in the lower and upper portions of the tool holder respectively and adapted to receive the cutting tool.

18 are screws engaging threaded orifices 19 in the tool holder and adapted to center and retain the cutting tool in position in the tool holder. The orifice 3 in the table forms a guide or bearing for the tool holder.

20 is a connecting rod attached at one end to the tool holder 12 and at the other end to the oscillating slide of the machine drive for reciprocating the cutting tool.

21 is a guide finger carried in a holder 22 of similar form to the holder portion 13. 23 are screws engaging threaded orifices 24 in the holder portion 22 for centering and retaining the guide finger therein. The holder 22 engages the orifice 7 and is retained therein by tightening the nuts 10 and drawing the lugs 8 together.

The tool holder extends upwardly through the orifice 3 in the table 1 and the finger 21 is located vertically above the cutting tool.

25 is the body portion of the die holder having its bottom face contacting with the table top 2 and consists of the annular portion 26 with the inwardly extending annular flange 27 at the bottom thereof having the horizontal upper face 28 and forming the central orifice 29. 30 are screws extending through threaded orifices in the portion 26.

31 is an annular disk having the central orifice 32 and is secured to the upper face of the portion 26 by the screws 33, the orifice 32 registering with the orifice 29.

34 is the die which is being finished and is secured in the die holder by means of the screws 30.

35 is the master templet and is secured to the upper disk 31 by means of the screws 36.

37 is the profile of the templet which is to be reproduced upon the die 34.

The operation of my device is as follows:

The die is first marked from the master templet and then roughed out in the ordinary manner on a drilling machine. In this operation the metal is at no point cut away to the final profile line of the die. The disk 31 is removed from the die holder and the blank is secured therein by the screws 30, the blank resting on the upper face 28 of the flange 37.

The disk 31 is now secured to the die holder by the screws 33.

The master templet 35 is now secured by the screws 36.

Since the screws 30 have independent freedom the position of the die blank can be adjusted so that it is in the desired posision vertically below the master templet.

The desired cutting tool having been properly centered and secured in the tool holder by means of the screws 18, the guide finger 21 is adjusted so that it is vertically above and exactly registering with the tool.

It will now be seen that if the cutting tool be reciprocated and the die holder moved by hand so that the guide finger 21 follows the profile of the master templet the cutting tool will remove the metal from the die until the profile thereof is an exact reproduction of that of the templet.

It will further be apparent, since the guide finger is of the same shape as the cutting tool and is located vertically above it, that it will be impossible for the cutting tool to remove too much metal from the die.

In the operation of the machine, the cutting tool is reciprocated so that at the top of its stroke it does not quite contact with the guide finger.

Hitherto the finishing of templets and cutting dies has been done mostly by hand and a very high degree of skilled labor has been necessary. Further the process was very slow and required constant comparison with the master templet.

By the use of my invention, it will readily be seen that the finishing can be completed very rapidly and, since the operation is entirely mechanical, highly skilled labor is not necessary and the finished die must be absolutely accurate. This will of course result in a very great reduction in the cost of manfacture as well as speeding up production.

While I have described my invention in one form only it is to be understood that many modifications might be made therein without departing from the spirit of the invention or the scope of the claims and the form shown is to be taken as illustrative and not in a limiting sense.

For instance while I have described a reciprocating cutting tool, such as a file, various types including rotating cutting tools might be used. Further while I have described the guide finger as being located directly above the cutting tool, in which case the profile of the master templet is exactly reproduced in size, I might offset the guide finger, in which case the profile of the master templet would be either enlarged or reduced on the die.

Further my invention could be used for a variety of purposes other than the actual finishing of cutting dies as described above.

What I claim as my invention is;

1. In a die cutting machine, a die holder supported to have free horizontal movement, a master templet and a die blank each carried horizontally by the die holder one vertically above the other, a cutting element engaging the die blank and guiding means co-acting with the master templet for controlling the relative movement of the master templet and die blank with respect to the cutting element.

2. In a die cutting machine, a die holder supported to have free horizontal movement, a master templet and a die blank adjustably carried in horizontal disposition and one vertically above the other by the die holder, a cutting element engaging the die blank and guiding means co-acting with the profile of the master templet for controlling the relative movement of the master templet and die blank with respect to the cutting element.

3. In a die cutting machine, a table, a die holder freely supported thereon, a master templet and a die blank carried by the die holder, a cutting element engaging the die blank, and a stationary guiding finger supported from the table and co-acting with the master templet for controlling the relative movement of the die blank with respect to the cutting element.

4. In a die cutting machine, the combination with the table thereof and a movable die holder freely supported thereon, of a cutting element extending vertically upward from the table, a guide finger supported vertically above the cutting element, a die blank supported horizontally within the die holder and adapted to engage the cutting element, a master templet supported horizontally in the die holder, its profile adapted to engage the guide finger and means for operating the cutting element.

5. In a die cutting machine, the combination with the table thereof and a movable die holder freely supported thereon, of a cutting element above the table, a guide finger supported vertically above the cutting element, a die blank supported horizontally within the die holder, and adapted to engage the cutting element, a master templet supported horizontally in the die holder its profile adapted to engage the guide finger and means for reciprocating the cutting element vertically.

6. In a die cutting machine, the combination with the table thereof having an orifice therethrough and a die holder freely supported thereon, of a tool holder extending upwardly through the orifice in the table, a vertically disposed cutting tool carried by the tool holder, an arm secured to the table and carrying an upright guide finger of the same cross-sectional shape as the cutting tool, vertically above the cutting tool, a die blank supported horizontally within the die holder and adapted to engage the cutting tool, a master templet supported horizontally in the die holder, its profile adapted to engage the guide finger, and means for reciprocating the tool holder vertically.

7. In a die cutting machine, the combination with the table thereof having an orifice therethrough and a die holder freely supported thereon, of a tool holder extending upwardly through the orifice in the table, a vertically disposed cutting tool adjustably carried by the tool holder, an arm secured to the table and adjustably carrying an upright guide finger of the same cross-sectional shape as the cutting tool, vertically above the cutting tool, a die blank supported horizontally within the die holder and adapted to engage the cutting tool, a master templet supported horizontally in the die holder, its profile adapted to engage the guide finger, and means for reciprocating the tool holder vertically.

ROBERT LLOYD HAWKES.

Witnesses:
R. E. CHAPMAN,
D. SANSONE.